(No Model.)

G. DE BEAULIEU.
VELOCIPEDE.

No. 303,821. Patented Aug. 19, 1884.

WITNESSES:
John H. Deemer
C. Sedgwick

INVENTOR:
G. De Beaulieu
BY Munn & Co
ATTORNEYS.

UNITED STATES PATENT OFFICE.

GEORGE DE BEAULIEU, OF TOLEDO, OHIO.

VELOCIPEDE.

SPECIFICATION forming part of Letters Patent No. 303,821, dated August 19, 1884.

Application filed June 2, 1884. (No model.)

*To all whom it may concern:*

Be it known that I, GEORGE DE BEAULIEU, of Toledo, in the county of Lucas and State of Ohio, have invented certain new and useful Improvements in Driving Mechanism for Velocipedes, of which the following is a full, clear, and exact description.

The object of my invention is to provide a simple, inexpensive, efficient, and durable clutch mechanism for driving velocipedes by connection with the axles and operating treadles or levers, and one that shall take instant effect to move the vehicle forward as the driving-treadle is depressed, and will readily adjust itself for the next stroke, irrespective of the length of stroke of the treadle.

The invention consists in a clutch mechanism made with an inner disk fixed to the vehicle-axle, and having a grip-flange against which a clutch-block held loosely in an outer loose disk is adapted to act when the loose disk is partially rotated by a coiled spring, which is fixed at one end to the loose disk and connected at the other end to the operating treadle or lever. The clutch-block, which is held loosely in a slot of the loose disk, is connected yieldingly to the disk by a spring, so that the block will be held in position to instantly act on the flange of the fixed disk as it is carried around and forced by a pin against the flange, all as hereinafter fully described and claimed.

Reference is to be had to the accompanying drawings, forming a part of this specification, in which similar letters of reference indicate corresponding parts in all the figures.

Figure 1:
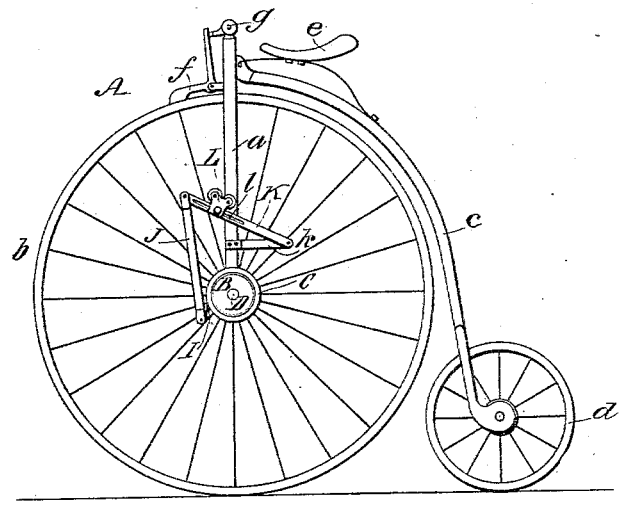
Figure 2:
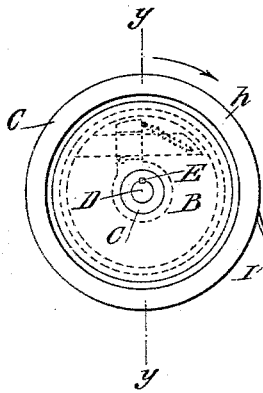
Figure 4:
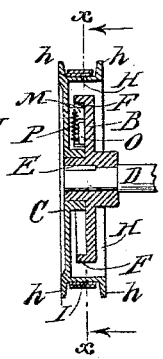
Figure 3:
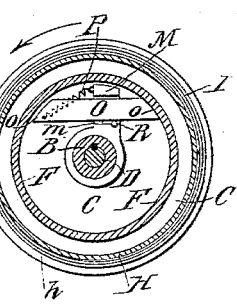

Figure 1 is a side view of a velocipede with my improvement applied. Fig. 2 is a face view of the driving-clutch mechanism at the right-hand side of the vehicle, and with interior parts in dotted lines. Fig. 3 is a longitudinal section through said clutch mechanism, taken on the line *x x*, Fig. 4; and Fig. 4 is a transverse section on the line *y y*, Fig. 2.

The letter A indicates a velocipede, (here shown in the form of a bicycle,) having any suitable forward forked frame, *a*, bridging over the top of the main wheel *b*, and held on the axle at each side of the wheel, and a rear curved frame or reach, *c*, connected to the fork *a*, and carrying the journaled trailing wheel *d* at its lower end and the seat *e* at its top, as shown. A brake, *f*, of any suitable kind, may be provided, also steering-handles *g*. The velocipede may, however, have any desired suitable construction as to its parts above named, as they form no part of my invention, which refers to the driving mechanism, and will be described as follows:

B is the inside disk-section of the driving-clutch, and C is its outside disk-section. The inner disk, B, is rigidly secured to the axle D of the vehicle by a key, E, or otherwise, and so that the axle shall be revolved by the rotation of the said disk B, which has a laterally-projecting flange, F, within and against which the clutch-block acts, as hereinafter described. The outer disk, C, is fitted loosely upon the outer portion of the hub of the disk B to revolve freely thereon, and has a backwardly-extending face or rim, H, having side flanges, *h*, to serve as edge-guides to the spring I, the inner end of which is fixed to the rim H in any suitable manner. The outer or free end of the spring I connects to the lower end of a bar, J, after the spring winds a couple of turns around the disk C and passes over the top of the disk, and so that the spring will be unwound to rotate the clutch in the direction of the arrow when the bar J is depressed by a treadle-bar, K, pivoted at one end to the top of the bar J and at the other end to the frame *a*, or to a bar, *k*, fixed to the said frame.

I prefer to provide the treadle-bar K with a foot-plate, L, fitted to slide along a slot, *l*, in the bar, so that the leverage may be adjusted as required.

On the inner face of disk C is formed a projection, M, which is at one side of the center of the plate, and has a transverse slot or recess, *m*, in which is fitted quite loosely at its side edges the clutch-block O, the ends *o* of which are shaped to fit the flange F of the disk B. One end of the block O is tied to the disk C by a spring, P, which serves to hold the block yieldingly to the disk and its projection M, both when the clutch is carried forward in direction of the arrow, as the spring unwinds by the downpull of the treadle-bar J, and when the rising of the treadle permits the spring I to rewind itself on the clutch and turn the disk C in the reverse direction, ready for the next pressure on the treadle by the foot of the rider. A strong pin, R, is so fixed in the projection M or disk C that when the treadle is depressed to turn the clutch forward the effort of the pin R to pass by the inner edge of the clutch-block O—which it cannot do—will bind the ends o of the block tightly to the flange F of the disk B, fixed to the axle, and turn the axle to move the vehicle forward, and on the up-stroke of the treadle, the pin R moving backward, will release the clutch-block and allow the axle-disk B to continue to move forward while the treadle rises for the next stroke. The pin R holds the clutch-block O above the lower edge of the slot or recess m, so that the block is fulcrumed, as it were, upon the pin, that it may the more readily adjust itself at the ends against the flange E of the disk B. The action of the pin R in binding the clutch-block is due to the advance of the pin on the block after its ends touch the flange F, and as allowed by the loose fit of the block in the recess m.

It will be understood that in bicycles a clutch mechanism as above described will be arranged on the axle at both sides of the main wheel. In other vehicles—such as tricycles—a number of the clutches may be fitted on the axle between the driving-wheels to connect with treadles or hand-levers, as will readily be understood.

It is evident that my improved clutch mechanism will work equally well irrespective of the length of stroke of the treadle, as the clutch-block will grip the flange F at any point of its friction-face, and in any position of the block, as it moves around by the pull of the spring.

My improvement may be applied to drive bicycles having a main drive-wheel of any size by varying the lengths of the connecting-rods J to suit the size of the wheel, as will readily be understood.

Having thus described my invention, I claim as new and desire to secure by Letters Patent—

1. A driving-clutch mechanism for velocipedes constructed with a disk, B, fixed to the vehicle-axle and having a flange, F, and a disk, C, fitted with a loose clutch-block, O, adapted to grip the flange, and a pin, R, for forcing the block against the flange, and a spring, I, fixed to and coiled around the disk C and connected by a bar, J, to the working treadle or lever, substantially as shown and described.

2. The combination, with the disk C, provided with the projection M, slotted at m, the clutch-block O, held loosely in the slot, and the fulcrum-pin R, which forces the block to the flange F, of the spring P, substantially as shown and described.

GEORGE DE BEAULIEU.

Witnesses:
JULIUS BLACK,
DAVID WINTER.